United States Patent
Tsuchiya et al.

[11] 3,956,046
[45] May 11, 1976

[54] METHOD FOR ULTRASONICALLY WELDING COMPOSITE SHEET MATERIAL

[76] Inventors: Kanji Tsuchiya, No. 25-4, Asagayaminami 2-chome, Suginami, Tokyo; Hitoshi Shukuya, No. 203, Oume, Oume, Tokyo, both of Japan

[22] Filed: July 12, 1974

[21] Appl. No.: 488,029

Related U.S. Application Data

[63] Continuation-in-part of Ser. No. 214,931, Jan. 3, 1972, abandoned.

[52] U.S. Cl. ................... 156/73.4; 53/39; 156/580
[51] Int. Cl.² ........................... B32B 31/22
[58] Field of Search ............ 156/73.1, 73.4, 580, 156/1, 583; 53/198 B, 39

[56] References Cited
UNITED STATES PATENTS

| | | | |
|---|---|---|---|
| 3,196,068 | 7/1965 | Schoder et al. | 156/581 |
| 3,687,787 | 8/1972 | Grand | 156/73.4 |
| 3,700,532 | 10/1972 | Pierson | 156/580 |
| 3,713,956 | 1/1973 | Cospen et al. | 156/580 |
| 3,748,709 | 7/1973 | Potin | 156/73.1 |
| 3,756,900 | 9/1973 | Michel | 156/580 |
| 3,814,656 | 6/1974 | Hanson et al. | 156/581 |
| 3,824,138 | 7/1974 | Karobath et al. | 156/73.4 |

*Primary Examiner*—Edward G. Whitby
*Attorney, Agent, or Firm*—Bauer, Amer & King

[57] ABSTRACT

There are described a method ultrasonically connecting, in overlapped relationship, a number of so-called processed paper sheets having coatings of a thermoplastic, synthetic resin material or a number of film sheets each consisting of a continuous phase of a thermoplastic, synthetic resin material and a dispersed phase of an inorganic material. The sheets to be connected are placed between a working table and an ultrasonic vibrator at least one of which has a surface configuration complementary to variations in thickness of the overlapped welding sheet portions, for uniformly distributing the ultrasonic vibratory energy and static pressure to the entire area of the overlapped sheets to preclude scorches which would otherwise be developed internally in particular localities of the overlapped sheets due to uneven distribution of the applied static pressure and the vibratory energy.

2 Claims, 10 Drawing Figures

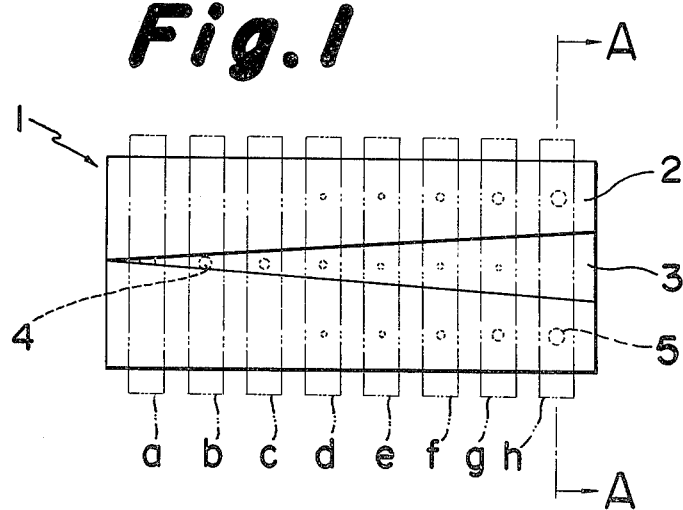
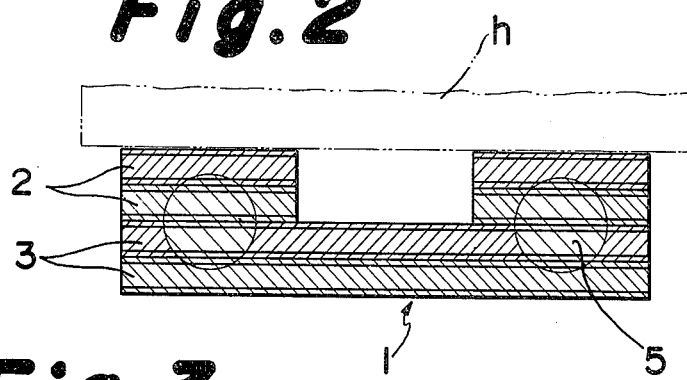
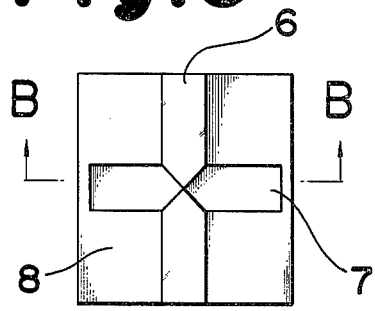
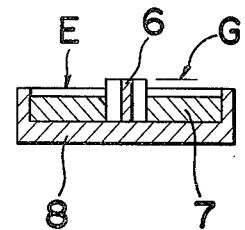

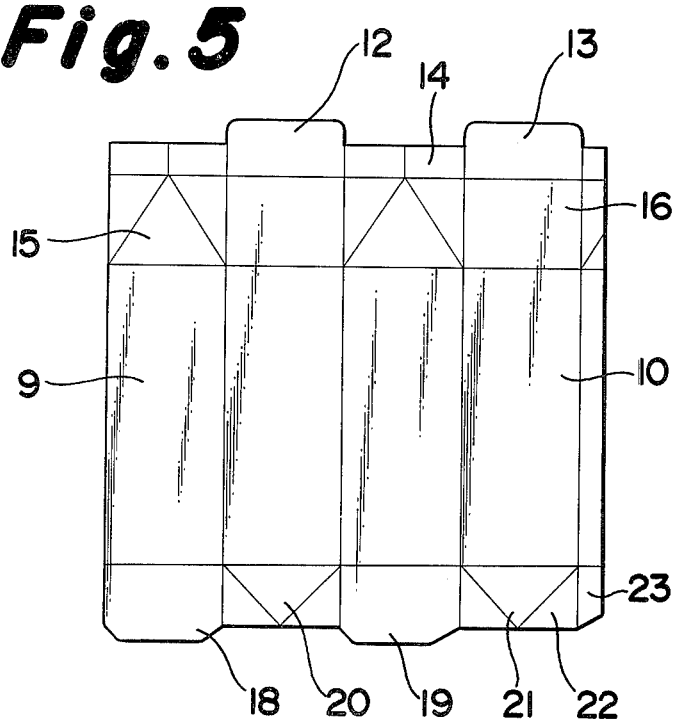
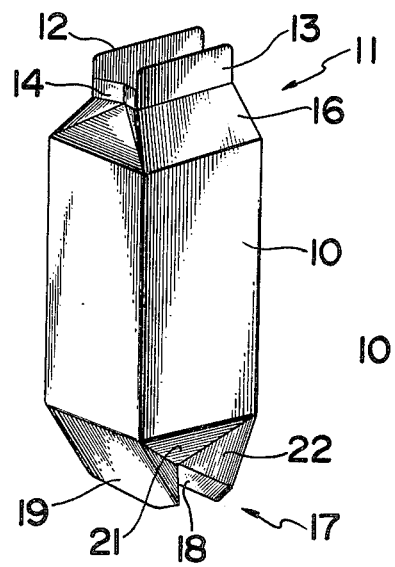
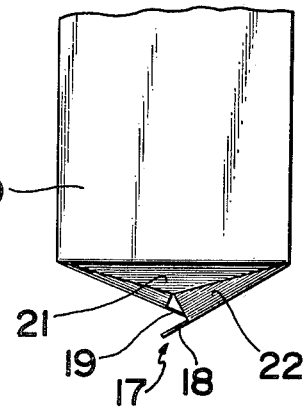

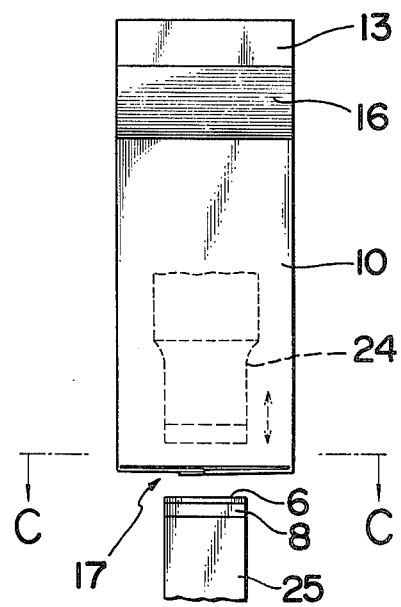
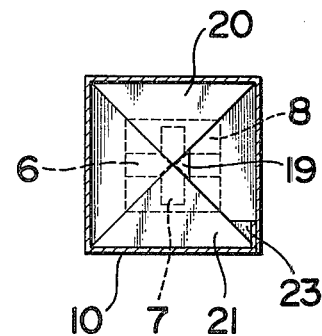
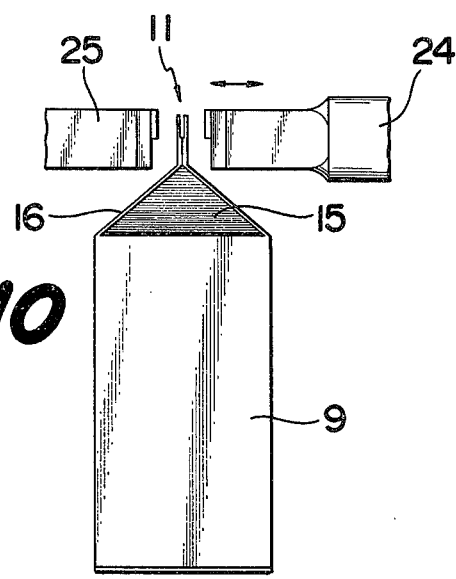

METHOD FOR ULTRASONICALLY WELDING COMPOSITE SHEET MATERIAL

This application is continuation-in-part of our copending application Ser. No. 214,931, filed on Jan. 3, 1972, now abandoned, for ULTRASONIC WAVE VIBRATION TOOL AND A BACKING TOOL THEREFOR FOR MELT ADHERING A COMPOSITE MATERIAL AND THE METHOD THEREFOR.

BACKGROUND OF THE INVENTION

This invention relates to ultrasonic welding of sheet material, and more particularly to a method and apparatus for ultrasonically welding, in overlapped relationship, a number of composite sheets.

The term "composite sheet" or "composite material" as herein used includes the so-called processed paper having a base layer of paper or paper-like scorchable material such as cellophane and an outer coated layer of a thermoplastic synthetic resin material, and a sheet or film material having a continuous phase of a thermoplastic synthetic resin material and a dispersed phase of an inorganic material.

There are several known methods and apparatus which utilize an ultrasonic vibrator or ultrasonic energy for bonding a number of sheets of a thermoplastic synthetic resin or uncoated foils of aluminum.

In the methods and apparatus for bonding or welding heretofore available, it has been a usual practice that at least one of vibrator tool or working table used therein has to be contoured to follow the configuration of the object to be bonded or welded.

This aims at maintaining the configuration of the objects to be bonded or welded in its original or predetermined form.

Such vibrator tool and working table are disclosed, for example, in U.S. Pat. Nos. 3,438,824, 3,386,870, 3,436,006, 3,671,366 and 3,440,118.

Yet, those are applicable only in bonding plastic materials.

There has been an increasing tendency in the packaging industry to utilize the processed paper or composite sheets as material for fabricating packaging containers for liquids, creams or other fluidized materials. When sealing such containers holding a liquid or fluid therein, it has been the conventional practice to employ an external heating means such as a gas burner or an electric heat irradiator. However, the employment of an external heating means is disadvantageous to a large-scaled production as it requires high production costs and complicated operational procedures which can be coped with only by high technical skills. Moreover, seals formed by an external heating means are generally insecure and less than satisfactory in appearance.

Many attempts have thus far been made to ultrasonically seal the packaging containers of the composite material of the nature as mentioned above. The prior art structure and methods have met with various difficulties since the composite sheet includes a layer of paper-like material which is thermally non-conductive and easily scorchable.

With a thermoplastic synthetic resin film dispersed with particles of an inorganic material, pin holes are formed in the film upon application of ultrasonic vibrations as the thermoplastic resin material is melted by the applied ultrasonic energy, dislodging the dispersed particles of the inorganic material. The scorches and pin holes are developed in an increased degree particularly where the sealing portion of the container has a varying thickness with a greater number of plies of the composite sheet in certain localities than in other localities. This is because the applied static pressure is unevenly distributed to the thicker and thinner portions of the overlapped sheets and the applied ultrasonic energy propagates non-uniformly into the overlapped sheets in the welding portion of the container, generating high scorching heat in particular localities of the welding portion by localized concentrations of the ultrasonic energy. For these reasons, it has been considered to seal the containers of the composite paper sheets by the use of the existing ultrasonic welding techniques.

SUMMARY OF THE INVENTION

It is therefore an object of the present invention to provide a method and apparatus for ultrasonically welding a number of composite paper sheets without developing any scorches or pin holes interiorly of the overlapped welded portions of the paper sheets.

It is another object of the present invention to provide a method and apparatus for ultrasonically welding, in overlapped relationship, a number of composite sheets by the use of an ultrasonic vibrator and a working table at least one of which has a surface configuration complementary to variations in thickness in the overlapped welded portions of the sheets.

It is a further object of the present invention to provide a method and apparatus for ultrasonically welding, in overlapped relationship, a number of composite sheets with uniform distribution of static pressure and ultrasonic energy to the entire overlapped welded portion of the composite sheets.

It is a still further object of the present invention to provide a method and apparatus for ultrasonically sealing the mouth of a container which is formed from a composite sheet of the nature as mentioned above, without developing any scorches or pin holes interiorly of the sealed mouth portion of the container.

Another object of the present invention is to provide a method and apparatus for ultrasonically sealing the mouth of a container which is formed from a composite sheet of the nature as mentioned hereinabove, by means of an ultrasonic vibrator and a working table at least one of which has a surface configuration complementary to variations in thickness of the sealed mouth portion of the container.

A further object of the present invention is to provide a method and apparatus for ultrasonically sealing the mouth of a container of a composite sheet of the nature as mentioned hereinbefore, in a most secure manner and without spoiling the appearance of the container.

BRIEF DESCRIPTION OF THE DRAWINGS

The above and other objects, features and advantages of the invention will become apparent from the following description of preferred embodiments of the invention and the appended claims, taken in conjunction with the accompanying drawings, wherein:

FIG. 1 is a schematic plan view of a test sample of overlappingly connected paper sheets with internal scorches;

FIG. 2 is a sectional elevational view taken along line A — A of FIG. 1;

FIG. 3 is a top view of a working table which cooperates with an ultrasonic vibrator;

FIG. 4 is a longitudinal section taken along line B — B of FIG. 3;

FIG. 5 is a developed plan view of a blank for a packing container to which the present invention can advantageously be applied;

FIG. 6 is a perspective view of the same container blank but showing same in a folded state;

FIG. 7 is a schematic elevational view showing a manner for sealing the bottom of the packing container by the ultrasonic welding according to the invention;

FIG. 8 is a schematic elevational view showing the manner for sealing the mouth of the packing container by the ultrasonic welding according to the present invention;

FIG. 9 is a sectional plan view taken along line C — C of FIG. 8; and

FIG. 10 is a transverse side elevational view showing the sealing of the mouth portion of container.

PARTICULAR DESCRIPTION OF THE INVENTION

In order to preclude development of scorches and pin holes during the welding process due to non-uniform distribution of ultrasonic vibratory energy and a static pressure over the welding portions of the overlapped composite sheets, which portions are imparted with a varying thickness due to partial folding or overlapping of the sheets, the method of the invention comprises the steps of (a) placing the portions of the composite sheets to be welded in overlapped relationship with each other; (b) positioning the overlapped portions of the composite sheets between an ultrasonic vibrator and a working table, at least one of which has a working surface configured to conform with the varying thickness of the overlapped portions of the composite sheets; and (c) applying ultrasonic vibratory energy and a static pressure uniformly over the entire area of the overlapped welding portions of the composite sheet by actuating said ultrasonic vibrator so that the sheets are bonded together securely without developing any scorches or pin holes therein.

The method of the invention can be put into practice by the use of conventional ultrasonic welding apparatus which is constructed such that a number of sheets are welded in overlapped relationship between an ultrasonic vibrator and a working table or anvil. However, in this instance, it is important to provide at least on one of the working surfaces of either the vibrator or the table a surface configuration complementary to the varying thickness of the overlapped portions of the sheet material to be welded so that the portions to be welded fit snugly between the vibrator and the working table to ensure uniform distribution of the ultrasonic vibratory energy and static pressure. The desired surface configuration can be imparted to either the ultrasonic vibrator or the working table in an easy manner by detachably mounting thereon an attachment having the desired surface configuration by means of an adhesive agent or by threaded engagement therewith. The provision of complementarily surface configuration on either or both of the ultrasonic vibrator and the working table may appear to be superficial but it is extremely important in welding composite sheets without developing therein any scorches or pin holes.

Examples of the thermoplastic synthetic resins suitable for the ultrasonic bonding includes polyethylene, polypropyrene, polystyrene, polyvinyl acetate, polyvinyl chloride, polyvinyl alcohol, methacrylic acid ester, polycarbonate and the like. A suitable thermoplastic synthetic resin material should be selected depending upon the particular purpose which the composite material is intended to serve, in combination with a base layer of either paper or cellophane. Preferably, the thermoplastic synthetic resin material is coated on each side of the base layer in a thickness of about 10 to 100 microns. Examples of the aforementioned inorganic material which is dispersed in a continuous sheet or film of a thermoplastic synthetic resin include calcium sulfate, talc, carbon, bentonite, silica and the like. These inorganic materials may be used individually or in combination, either in the form of fine powder or colloid. It is preferred that the inorganic material is dispersed in a large amount in the continuous phase of the thermoplastic synthetic resin, more particularly, in an amount of 70 to 95 wt% in 5 to 30 wt% of thermoplastic resin. However, it should be noted that the proportion of the powdery inorganic material is also determined depending upon the particular purpose which the composite sheet is supposed to serve and in relation with the kind of the thermoplastic resin material to be employed.

The principles of the invention will be understood more clearly from consideration of the following description on the experiments concerning the development of scorches and pin holes and the ensuing Examples.

Experiment - Development of Scorches

A test sample 1 was prepared by superposing two rectangular polyethylene coated paper sheets (hereinafter referred to simply as PE-coated paper sheet) one on the other and placing two trapezoidal same PE-coated paper sheets on each side of the longitudinal axis of the sample to provide a triangular two-ply portion 3 and a pair of trapezoidal four-ply portions 2 on opposite sides of the two-ply portion 3, as shown in FIG. 1. That is to say, the trapezoidal four-ply portions 2 have a thickness two times greater than the triangular two-ply portion 3 shown in FIG. 1. The test sample 1 was divided into eight sampling sections (a) to (h) for the convenience of subsequent observations.

The test sample 1 of FIG. 1 was placed on an anvil having a flat working surface and bonded together by applying vibrations of 28 KHz and a static pressure of 33 kg to each of the sampling sections (a) through (h) by means of the same rod-shaped 6 mm thick ultrasonic vibrator having a flat vibrating surface. The vibrations were applied for one second and the test sample was retained in the compressed state for a further time period of 0.8 seconds.

After the ultrasonic adhesion of the test sample 1, it was found that a number of schematically illustrated scorches 5 were developed internally in the areas of the two-ply and four-ply portions 3 and 2 that are overlapped in the test sample 1. In the triangular two-ply portion 3, a series of scorches 4 were developed internally along the longitudinal axis of the test sample 1 in a size increasing toward the apex of the triangle at the lefthand end of the test sample 1, as seen in FIG. 1. More particularly, the scorch 4 was largest in the sampling section (a) and smallest in the sampling section (h). On the other hand, in the trapezoidal four-ply portions 2 on opposite sides of the two-ply portion 3, scorches 5 were developed at positions intermediate the outer and inner sides of the respective trapezoids, the size of the scorch 5 being largest in the sampling section (h) and reduced toward the sampling section (a) at the wider ends of the respective trapezoids. As shown in FIG. 1, the four-ply sampling portion 2 each had a large scorch 5 in the sampling section (h). However, almost no scorch was recognized in the sampling section (a).

Gathering from the particular distribution and variations in size of the scorches, it is evident that the applied ultrasonic vibrations are reflected inwardly on the inner edges of the four-ply portions 2 as well as on the outer edges and upper and lower surfaces of the test sample 1 and urged to propagate toward and concentrate at the center of the two-ply and four-ply portions in each sampling section of the test sample 1, producing increased heat thereat to such a degree as would scorch the material forming the base layer of the respective PE-coated sheets. The scorch 4 is almost absent in in the two-ply portion 3 in the sampling section (h). The scorch 5 is almost absent in the four-ply portion in the sampling section (a). This is because the two-ply portion 3 in the sampling section (h) and the four-ply portion 2 in the sampling section (a) are wide enough to dissipate a substantial amount of heat while the reflected vibrations are propagated toward the center of the two-ply and four-ply portions, without causing any scorches. As a whole, the four-ply portions 2 have scorches of greater degree than the two-ply portion 3 as the former receive a greater static pressure than the latter.

Furthermore, with a PE-coated paper sheet, the outer layer of polyethylene has a specific heat of 0.55 cal/g deg. while the base layer of paper fibre has a specific heat of 0.33 cal/g deg. However, polyethylene is higher in resiliency and absorption of the propagated ultrasonic energy than paper fibre and assumes a molten state at about 108° to 120°C. If the ultrasonic energy is concentrated at particular spots, polyethylene easily reaches the temperature of about 375°C which is the ignition point of the paper fibre, thus causing scorches to the latter. In this instance, the scorches are developed only in the base layer by the so-called internal heat and not developed in the outer coated layers of the thermoplastic resin material which are in contact with the vibrator and the working table.

In addition to the experiment on PE-coated paper sheets described above, a similar ultrasonic welding test was conducted on composite sheets each consisting of a polyethylene film having dispersed therein with a relatively great amount of a powdery inorganic material. The composite sheets were superposed to obtain a test sample as shown in FIG. 1 and the sample was ultrasonically bonded together with use of the same vibrator and working table having plane working surfaces. In this case, no scorches were developed in the bonded composite sheets since no scorchable material was used in the sheets. However, the powder of the inorganic material was dislodged as the thermoplastic resin melted, forming pin holes in the polyethylene film at positions where scorches were developed with the test sample of the PE-coated paper sheets as mentioned hereinabove.

In consideration of these observations, it has been found that either the working table or the vibrator which is in contact with the composite sheets should have a surface configuration which is complementary to variations in thickness of the composite sheets which are caused by folding or superposing them, in order to ensure a more secure welding of the sheets and preclude scorches and burnt holes which would otherwise be formed in the ultrasonically bonded composite sheets. In this connection, it is necessary to round off sharp edges in the surface configuration of either the working table or the vibrator as sharp edges would encourage inward reflection of the ultrasonic vibrations and contribute to the development of scorches or pin holes in the composite sheet portions which are disposed inwardly of the sharp edges.

EXAMPLE

Referring to FIG. 5, a blank for a box-shaped container 11 was formed from a PE-coated paper sheet having a base layer of paper with a thickness of 230 g/m$^2$, an upper coated layer of polyethylene film with a thickness of 30 $\mu$m and a lower coated layer of polyethylene film with a thickness of 20 $\mu$m. The blank was formed into a tubular shape by welding a longitudinal marginal edge 23 to another longitudinal edge on opposite side of the blank. The welding of the longitudinal side edges was relatively easy since the welding portions consisted entirely of two plies of the PE-coated paper sheet. The creased upper end walls 14 and 15 were folded inwardly between two opposingly faced non-creased upper end walls with flaps 12 and 13. Similarly, creased lower end walls 20 and 21 were folded inwardly between two opposingly faced non-creased lower end walls with flaps 18 and 19, in the manner as shown in FIG. 6. The lower end walls are shorter than the upper end walls and can be folded at right angles with respect to the side walls to form a flat bottom for the container as shown in FIG. 8. The thus folded lower end walls were welded together ultrasonically according to the invention.

More particularly, the folded upper end walls of the container were sealed by an ultrasonic welding apparatus as shown in FIG. 8. In FIG. 8, there is indicated at 25 a working table or anvil for receiving thereon the portions of the container to be welded in the usual manner. An attachment 8 is securely mounted on the vibrating surface of the vibrator 24 or on the working table for imparting thereto a surface configuration complementary to variations in thickness of the folded portions of the container to be welded as will be discussed hereinafter with reference to FIGS. 3 and 4. Preferably, the attachment 8 is mounted in position detachably by means of threaded engagement or by a suitable adhesive agent.

In the particular embodiment shown, the working table 25 has a raised surface area 6 having a height G for abuttingly receiving the overlapped flaps 18 and 19 at the bottom 17 of the container 11. In the welding operation, the attachment 8 is disposed preferably horizontally. The attachment 8 further includes a lower surface portion 7 which is adapted to be brought into abutting engagement with the four-ply portion formed by the folded end walls 20, 21 and 22 of the bottom of the container 11.

In order to seal the bottom of the container 11, the vibrator 24 is inserted into the container as shown in FIG. 8 for imposing ultrasonic vibratory energy on the welding bottom portions while pressing the same against the configurated surface of the working table 25 in the manner as shown in FIGS. 8 and 9.

The working table 25 has a height or level gap G between the raised surface portion 6 which receives the two-plied welding portion and the lower surface portion 7 which receives the four-plied welding portion of the container. Furthermore, the working table 25 is provided with raised portion 15 around the lower surface portion 7 thereby to apply increased stress around the four-ply portion in the folded end walls of the container to ensure a more secure weld between the overlapped welding sheet portions.

The overlapped welding sheet portions receive a static pressure from the vibrator 24 and the working table 25. The static pressure to be applied on the overlapped welding sheet portions plays an important role in ensuring a secure weld and can be calculated from the following equation, $$W = B \cdot H \cdot 10^{\alpha \left(1 - \frac{G}{2d}\right)} \cdot 46 + 4 \cdot 10^{\alpha \frac{E}{4d}}$$

wherein W represents a static pressure to be applied, H the width of the vibrator, G a level gap between a raised surface portion and a lower surface portion on either the vibrator or the working table, E a level gap of a raised surface portion provided around the periphery of the lower surface portion, d the thickness of the sheet material to be welded, and B(kg/mm²) and α represent compression characteristics of the sheet material.

The mouth of the container can be sealed almost in a similar manner by the ultrasonic welding according to the invention. In this instance, the welding portions included a four-ply portion constituted by upper end walls 12 and 13 and the end wall 14 or 15 inwardly folded between the end walls 12 and 13 and a two-ply portion constituted by the flaps at the upper edge of the end walls 12 and 13. In order to weld the upper end or mouth of the container 11, an attachment having a particular surface configuration complementary to the variations in thickness of the overlapped mouth portions to be welded was mounted on either the working table 25 or on the vibrating surface of the vibrator 24 or on both the working table 25 and the vibrator 24 (FIG. 10). The ultrasonic vibratory energy is applied by means of the vibrator 24 to the overlapped sheet portions to be welded while holding the same in a compressed state between the vibrator and the working table.

Both the bottom and mouth portions of the container were sealed in the manner as explained above with use of a frequency of 28 kHz, a welding power of about 200 W, a compressive force of 36 kg, an ultrasonic wave impression time of 1.0 second, and a retaining time of 0.8 second.

The bottom and mouth of the container 11 were welded and sealed securely and neatly without impairing the appearance of the container in any way whatsoever.

It will be understood from the foregoing that, according to the present invention, mouths of containers holding therein a liquid or fluidized or creamy material can be sealed as they are, that is to say, without evacuating them prior to the sealing operation.

It will be understood that many changes, improvements in configuration and adjoining parts may be made in the above described embodiments of the invention without departing from the scope thereof. In addition, the instant invention can easily be applied to various fields other than the packaging industry. It is therefore intended that all matter contained in the foregoing description or shown in the accompanying drawings shall be interpreted as illustrative and not in a limiting sense.

What I claim as new and desire to secure by Letters Patent is:

1. A method for ultrasonically welding composite sheet material comprising the steps of:
    a. placing portions of the composite sheets to be welded in overlapped relationship with each other;
    b. positioning the overlapped portions of the composite sheets to be welded between an ultrasonic vibrator and a working table, at least one of which has a working surface configurated to conform with a varying thickness of the overlapped portions of said composite sheets to be welded; and
    c. applying ultrasonic vibrations and a static pressure uniformly over the entire area of said overlapped portions of the composite sheets to be welded so that the sheets are bonded together securely without developing any pin holes therein; said composite sheets comprising a continuous phase of a thermoplastic synthetic resin selected from the group consisting of polyethylene, polypropyrene, polystyrene, polyvinyl acetate, polyvinyl chloride, polyvinyl alcohol, methacrylic acid ester and polycarbonate and fine powder of an inorganic material uniformly dispersed in said continuous phase of said thermoplastic synthetic resin and selected from the group consisting of calcium sulfate, talc, carbon, bentonite and silica.

2. The method according to claim 1, wherein said fine powder of said inorganic material is dispersed in said thermoplastic synthetic resin an amount of 70 to 95 % by weight.

* * * * *

UNITED STATES PATENT OFFICE
CERTIFICATE OF CORRECTION

PATENT NO. : 3,956,046
DATED : May 11, 1976
INVENTOR(S) : Kanji Tsuchiya & Hitoshi Shukuya It is certified that error appears in the above-identified patent and that said Letters Patent are hereby corrected as shown below:

Claim 2, line 3, after "resin" insert --in--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*